(12) United States Patent
Masjuan

(10) Patent No.: US 11,606,245 B1
(45) Date of Patent: Mar. 14, 2023

(54) VALIDATING ENDPOINTS IN A SERVICE MESH OF A DISTRIBUTED COMPUTING SYSTEM

(71) Applicant: Red Hat, Inc., Raleigh, NC (US)

(72) Inventor: Xavier Canal Masjuan, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/549,331

(22) Filed: Dec. 13, 2021

(51) Int. Cl.
*H04L 41/0654* (2022.01)
*H04L 67/51* (2022.01)
*H04L 67/1001* (2022.01)

(52) U.S. Cl.
CPC ...... *H04L 41/0672* (2013.01); *H04L 67/1001* (2022.05); *H04L 67/51* (2022.05)

(58) Field of Classification Search
CPC .. H04L 41/0672; H04L 67/1001; H04L 67/51
See application file for complete search history.

(56) References Cited

U.S. PATENT DOCUMENTS

| | | |
|---|---|---|
| 10,623,390 B1 | 4/2020 | Rosenhouse |
| 10,778,539 B1 * | 9/2020 | Hussain ............... H04L 41/5054 |
| 10,785,122 B2 | 9/2020 | Inamdar et al. |
| 2005/0204028 A1 * | 9/2005 | Bahl ...................... H04L 41/145 709/223 |
| 2020/0127980 A1 | 4/2020 | Smith et al. |
| 2021/0019194 A1 | 1/2021 | Bahl et al. |
| 2022/0152826 A1 * | 5/2022 | Danielczuk ............ B25J 9/1666 |

OTHER PUBLICATIONS

"Service meshes in a microservices architecture," Downloaded from Internet 2021, https://cloud.google.com/architecture/service-meshes-in-microservices-architecture.
Chandramouli, R., et al., "Building Secure Microservices-based Applications Using Service-Mesh Architecture," National Institute of Standards and Technology, 2020, https://nvlpubs.nist.gov/nistpubs/SpecialPublications/NIST.SP.800-204A-draft.pdf.
Stafford, G., "Kubernetes-based Microservice Observability with Istio Service Mesh: Part 1," ITNEXT, 2019, https://tnext.io/kubernetes-based-microservice-observability-with-istio-service-mesh-part-1-bed3dd0fac0b.
Stafford, G., "Kubernetes-based Microservice Observability with Istio Service Mesh: Part 2 of 2," ITNEXT, 2019, https://programmaticponderings.com/2021/06/13/kubernetes-based-microservice-observability-with-istio-service-mesh-part-2-of-2/.

* cited by examiner

*Primary Examiner* — Sm A Rahman
(74) *Attorney, Agent, or Firm* — Kilpatrick Townsend & Stockton LLP

(57) ABSTRACT

Some examples of the present disclosure relate to validating endpoints in a service mesh of a distributed computing environment. In one example, a processor can receive configuration settings applied to an endpoint in a data plane of a service mesh in a distributed computing environment. The processor can receive configuration data associated with a configuration of hardware components and software components in the distributed computing environment. The processor can determine a discrepancy between the configuration settings and the configuration data. The processor can then output the discrepancy for use in resolving an operational error relating to the service mesh.

20 Claims, 4 Drawing Sheets

VALIDATING ENDPOINTS IN A SERVICE MESH OF A DISTRIBUTED COMPUTING SYSTEM

TECHNICAL FIELD

The present disclosure relates generally to endpoints in service meshes. More specifically, but not by way of limitation, this disclosure relates to validating endpoints in service meshes of distributed computing systems.

BACKGROUND

A service mesh is an infrastructural layer that manages service-to-service communication in a distributed computing environment, such as a cloud computing environment or computer cluster. The service mesh can be a separate infrastructure layer on top of a container orchestration platform, such as Kubernetes. The service mesh can include a data plane and a control plane. The data plane can forward traffic through the service mesh using proxies (e.g., sidecars). The control plane can handle the configuration, administrative, security and monitoring related functions of the service mesh. To that end, the control plane can interface with the data plane to define how the data plane functions, for example to coordinate the data flow among the proxies in the data plane. One popular type of service mesh is the Istio™ service mesh, which uses proxies called "Envoy™ sidecars" to facilitate communication among services.

Each proxy in the data plane can serve as an endpoint for a corresponding service. To facilitate this functionality, in some cases a proxy and its corresponding service may be integrated into the same pod in the distributed computing environment. A pod is a group of one or more containers (isolated virtual environments) with shared storage and network resources, where the pod's contents are co-located and co-scheduled and may run in a shared context. The proxy may process incoming and outgoing communication for its associated service and may relay the communications to the service. The proxy may route traffic based on information included in the incoming and outgoing communications.

DETAILED DESCRIPTION

Figure 1:
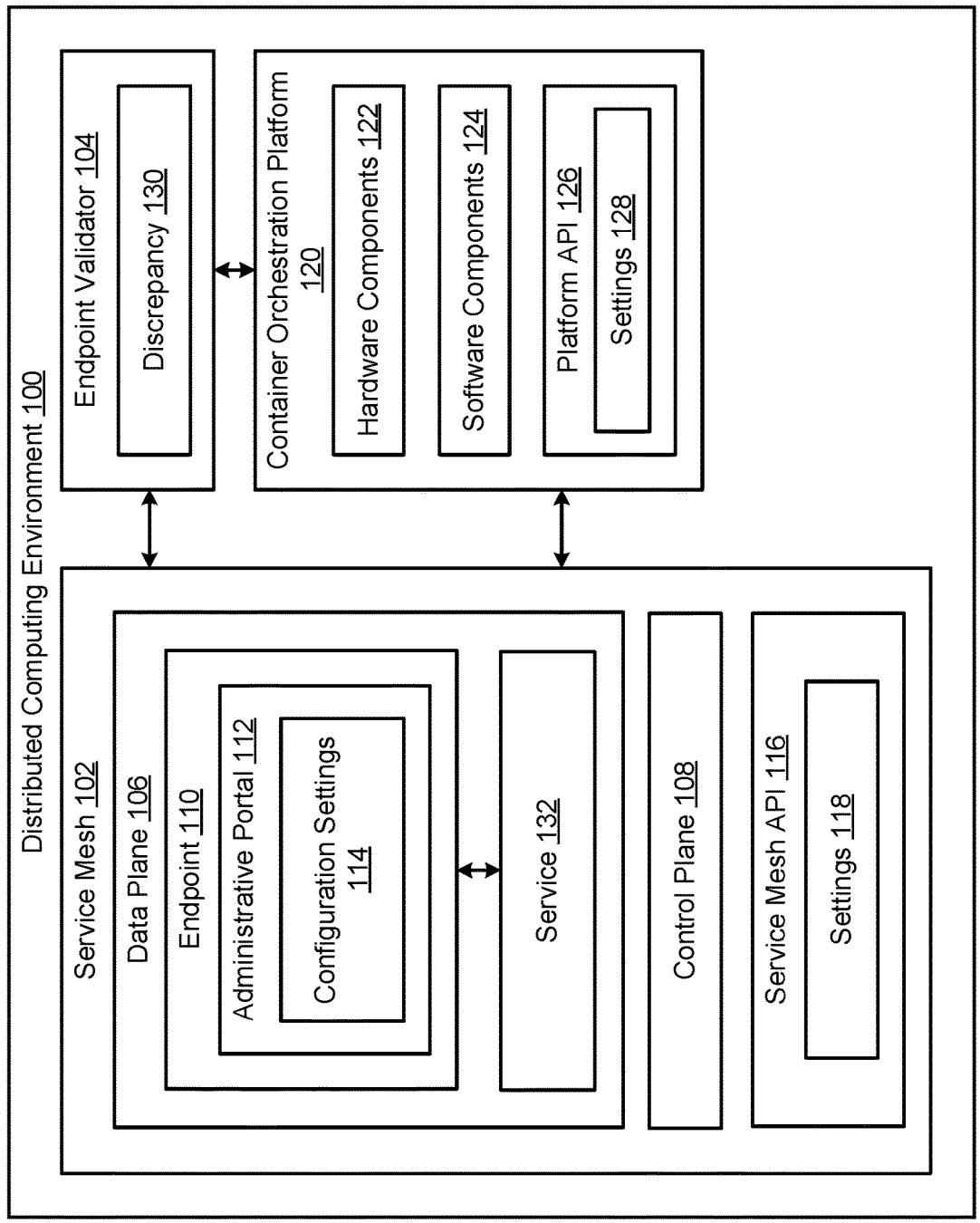
FIG. 1 is a block diagram of an example of a distributed computing environment with an endpoint validator for validating an endpoint in a service mesh according to some aspects of the present disclosure.

A service mesh may coordinate service-to-service communication for services in a distributed computing environment. The service mesh can include a data plane with endpoints for the services to facilitate communication among the services. The endpoints are separate and distinct from the services themselves. While having these separate endpoints can improve the flexibility of the service mesh, they also increase the complexity of communication between services in the distributed computing environment and may introduce additional potential failure points for the service mesh. For example, if an endpoint is improperly configured, it may lead to errors in the operation of the service mesh. These types of errors can be particularly challenging to detect. For example, it may be challenging to determine if the root cause of an operational error in the service mesh is an improperly configured endpoint. And once such a determination is made, it may be even more challenging to determine which part of the endpoint's configuration is the culprit. This is because the configuration files for a particular endpoint may have thousands of lines of code corresponding to dozens settings. Additionally, it may be difficult to determine if an endpoint has access to the necessary services and other resources (e.g., software and hardware) in the distributed computing environment to coordinate communication as intended.

Some aspects of the present disclosure may overcome one or more of the abovementioned problems using an endpoint validator for determining configuration settings for an endpoint of a service in a service mesh of a distributed computing environment, determining configuration data for one or more platforms of the distributed computing environment, and determining discrepancies between configuration settings and the configuration data. Examples of the platforms can include the service mesh platform and a container orchestration platform. The endpoint validator may determine that the one or more discrepancies are causing an operational error in the service mesh. In some examples, the endpoint validator may automatically update the configuration settings for the endpoint to resolve the operational error. Additionally or alternatively, the endpoint validator may update settings for the service mesh and/or the container orchestration platform to help resolve the operational error. For example, the endpoint validator may restart a pod, synchronize the control plane, or change labels for a deployment of a container in a pod. Alternatively, the endpoint validator may output the discrepancy to a user (e.g., a system administrator) so that the user can update the configuration settings to resolve the operational error. The endpoint validator may allow for prompt detection and handling of operational errors. In some examples, the endpoint validator may attempt to determine discrepancies at a certain rate, such as once per minute. In other examples, the endpoint validator may be prompted, such as by a user or by the distributed computing environment, to determine discrepancies in response to an operational error. For example, the distributed computing environment may detect an operational error with the service mesh and automatically trigger the endpoint validator in response to detecting the operational error. This may facilitate an automated resolution of the operational error.

In one particular example, the distributed computing environment may include an authentication service for authenticating a login. The endpoint validator may receive configuration settings for the endpoint associated with the authentication service, as well as configuration data from a container orchestration platform that is handling the software and hardware for the authentication service. For example, the container orchestration platform may be Kubernetes and the endpoint may be an Envoy sidecar within an Istio™ service mesh. The authentication service may be experiencing an operational error, such as a failure to output a login authentication. The endpoint validator may compare the configuration settings to the configuration data to determine a discrepancy that is a source of the operational error. For example, the discrepancy may be a misapplied setting in a configuration file for the endpoint. The endpoint validator may output the discrepancy to a system administrator for allowing the misapplied setting to be updated in a way that resolves the operational error.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a distributed computing environment 100 with an endpoint validator 104 for validating an endpoint 110 in a service mesh 102 according to some aspects of the present disclosure. The distributed computing environment 100 may include multiple services 132 that communicate with one another via endpoints in a service mesh 102. Instances of the services 132 may run in containers coordinated by a container orchestration platform 120. The containers may be deployed in pods by the container orchestration platform. In some examples, the service mesh 102 may be the Istio™ service mesh and may employ Envoy™ sidecar proxies as endpoints. Alternatively, the distributed computing environment 100 may include other types of service meshes (e.g., Linux Foundation Linkerd™, Hashicorp Consul®, etc.), proxies (e.g., NGINX®, HAProxy®, etc.), and container orchestration platforms (e.g., Docker Swarm®, Aprache Mesos®, etc.). The distributed computing environment 100 may include hardware components 122 and software components 124. The hardware components 122 may execute the container orchestration platform 120 and the software components 124.

The container orchestration platform 120 may include a platform application-programming interface (API) 126 usable to configure settings 128 for the container orchestration platform 120. The platform API 126 may be a built-in part of the container orchestration platform 120, for example that is shipped with the container orchestration platform 120. The settings 128 can include configurable settings for the hardware components 122 (e.g., storage devices, memory devices, and processors) and software components 124. The settings 128 can additionally include data related to the execution of services 132 within the distributed computing environment 100, such as workload data, instance data, and container data. The endpoint validator 104 may access the set of settings 128 from the platform API 126, for example by transmitting a request for the settings 128 to the platform API 126.

The service mesh 102 includes a data plane 106 and a control plane 108. The data plane 106 includes an endpoint 110 for a corresponding service 132. Although FIG. 1 depicts a single endpoint 110 for a single service for simplicity, in some examples multiple endpoints may be included for multiple services. For example, each service may be associated with a corresponding endpoint for handling communication for that service. The control plane 108 can configure and coordinate endpoints 110 in the data plane 106 to enable communications between services. For example, the control plane 108 may convert high-level routing rules that control traffic behavior into specific configurations for endpoints associated with containers or pods and propagate the rules to the endpoints at runtime. In some examples, the control plane 108 can serve as a layer of abstraction that insulates the service mesh 102 from the underlying configuration and details of the container orchestration platform 120 on which the service mesh 102 is running.

The endpoint 110 may provide various functionalities in relation to the corresponding service 132. Examples of these functionalities can include load balancing, circuit breaking, authorization, authentication, and other functions. In some examples, the endpoint can be implemented as a sidecar. A sidecar is a container that can operator alongside a service container (e.g., service 132) to provide the service container with additional capabilities. Such sidecars can mediate and control network communication between services in the data plane 106.

The endpoint 110 can include an administrative portal 112 usable to configure the endpoint 110. In some examples, the administrative portal 112 may be an API for the endpoint 110. The administrative portal 112 may be accessed to set configuration settings 114 for the endpoint 110. The endpoint validator 104 may access the configuration settings 114 for the endpoint 110 by interacting with the administrative portal 112, for example by transmitting a request to the administrative portal 112. Alternatively or additionally, the endpoint validator 104 may access configuration settings 114 for the endpoint 110 from a stored configuration file. For example, the configuration settings 114 for an endpoint 110 may be stored in a configuration file, which in turn may be located in a pod associated with the endpoint 110 or elsewhere in the distributed computing environment 100. So, the endpoint validator 104 can retrieve the configuration file its location and extract the configuration settings 114 for the endpoint 110 therefrom.

The service mesh 102 also includes a service mesh API 116. The service mesh API 116 includes settings 118 for the control plane 108. The settings 118 can include configuration settings, administrative settings, security settings, and monitoring settings. Examples of the configuration settings may include network settings applicable to the data plane 106 to control traffic flow through the data plane 106. The settings 118 may also include other information relating to operation of the data plane 106, such as workloads, services, namespaces, configuration objects, and synchronization information associated with the data plane 106. The endpoint validator 104 may access the settings 118 by interacting with the service mesh API 116, for example by transmitting a request to the service mesh API 116.

After receiving the configuration settings 114 from the administrative portal 112, the settings 118 from the service mesh API 116, and the settings 128 from the platform API 126, the endpoint validator 104 may determine a discrepancy 130 between some or all of these settings. The discrepancy 130 may be a source of an operational error for the service mesh 102. In some examples, the endpoint validator 104 may determine that the discrepancy 130 is located in the configuration settings 114 for the endpoint 110. For example, the configuration settings 114 may include an incorrectly configured line of code. Alternatively or additionally, the endpoint validator 104 may determine that the discrepancy 130 is located in the settings 118 for the service mesh 102, the settings 128 for the container orchestration platform 120, or both. For example, a discrepancy 130 in the settings 118 for the service mesh 102 can include an improperly configured network setting, such as a selection of an invalid or inoperable network, thus preventing communication via the endpoint 110. In another example, a discrepancy 130 in the settings 128 for the container orchestration platform 120 can include an invalid or inoperable node, thus preventing the associated endpoint 110 from receiving communications.

To determine the one or more discrepancies 130, the endpoint validator 104 can perform one or more operations. For example, the endpoint validator 104 may identify corresponding settings between the configuration settings 114 and the settings 118, or between the configuration settings 114 and the settings 128, to determine discrepancies between corresponding values. To do so, in some examples the endpoint validator 104 may parse the configuration settings 114, settings 118, and settings 128 to determine corresponding settings. For example, the endpoint validator 104 may parse through the settings 114, 118, 128 to determine that a node setting from the settings 128 corresponds to a node setting for the endpoint 110. In some examples, relationships between corresponding settings may be expressed in a predefined lookup table. For example, the wording or syntax of some of the configuration settings 114 may be different from how similar or related settings are defined in the settings 114-118. So, the endpoint validator 104 may access the predefined lookup table to determine relationships between various settings to determine which settings correspond to one another.

After determining corresponding settings, the endpoint validator 104 may identify discrepancies between the corresponding settings. For example, the endpoint validator 104 can determine that a memory allocation in the settings 128, a rate of transmitted messages in the configuration settings 114, and a packet transmission rate (e.g., for causing the endpoint 110 to transmit messages at a certain rate) in the settings 118 all correspond to one another. The endpoint validator 104 may then determine that a discrepancy 130 exists among these settings because the packet transmission rate in the settings 118 is different than the rate of transmitted messages by the endpoint 110. In some examples, the endpoint validator 104 may determine that a difference in settings can be a discrepancy if the difference is greater than a predefined tolerance, such as greater than 2%. The endpoint validator 104 may also determine that the container orchestration platform 120 has not allocated enough memory for the endpoint 110 to transmit messages at the certain rate, which may be another discrepancy 130.

In response to determining the one or more discrepancies 130, the endpoint validator 104 can determine and execute an update for resolving the operational error. For example, the endpoint validator 104 can determine that the operational error can be resolved by updating a particular configuration setting 114. The endpoint validator 104 may then update the particular configuration setting 114. Additionally or alternatively, the endpoint validator 104 may determine that the operational error may be resolved by updating a setting 118 for the control plane 108 or a setting 128 for the container orchestration platform 120. In the example described above, the endpoint validator 104 may direct the container orchestration platform 120 to allocate more memory to the endpoint 110 for transmitting messages. Additionally or alternatively, the endpoint validator 104 may output a graphical user interface to a user that displays the particular configuration setting 114. The user may then input a command to the graphical user interface to update the particular configuration setting 114 to resolve the operational error. Alternatively, the user may input a command to the graphical user interface to update a different setting for resolving the operational error. The endpoint validator 104 may then update the different setting as prompted by the user.

In some examples, the endpoint validator 104 may validate an endpoint 110 in response to a trigger. For example, the trigger can include a command from a user. Alternatively, the endpoint validator 104 or another component of the distributed computing environment 100 (e.g., the control plane 108) may automatically monitor the performance of the service mesh 102 to detect operational errors such as communication failures between services 132. If such an operational error is detected, the endpoint validator 104 can then be automatically triggered determine discrepancies 130. In other examples, the endpoint validator 104 may automatically determine discrepancies 130 without a particular triggering event. For example, the endpoint validator 104 may automatically and repeatedly perform the above process at a particular interval, which may be predetermined and customizable by a user. For example, the particular interval may be every twenty seconds.

Although FIG. 1 shows a certain number and arrangement of components, it will be appreciated that FIG. 1 is intended to be illustrative and non-limiting. Other examples may include more components, fewer components, different components, or a different arrangement of the components shown in FIG. 1. For example, although the distributed computing environment 100 includes one endpoint 110 in the example of FIG. 1, the distributed computing environment 100 may include a larger number of endpoints 110 in other examples.

Figure 2:
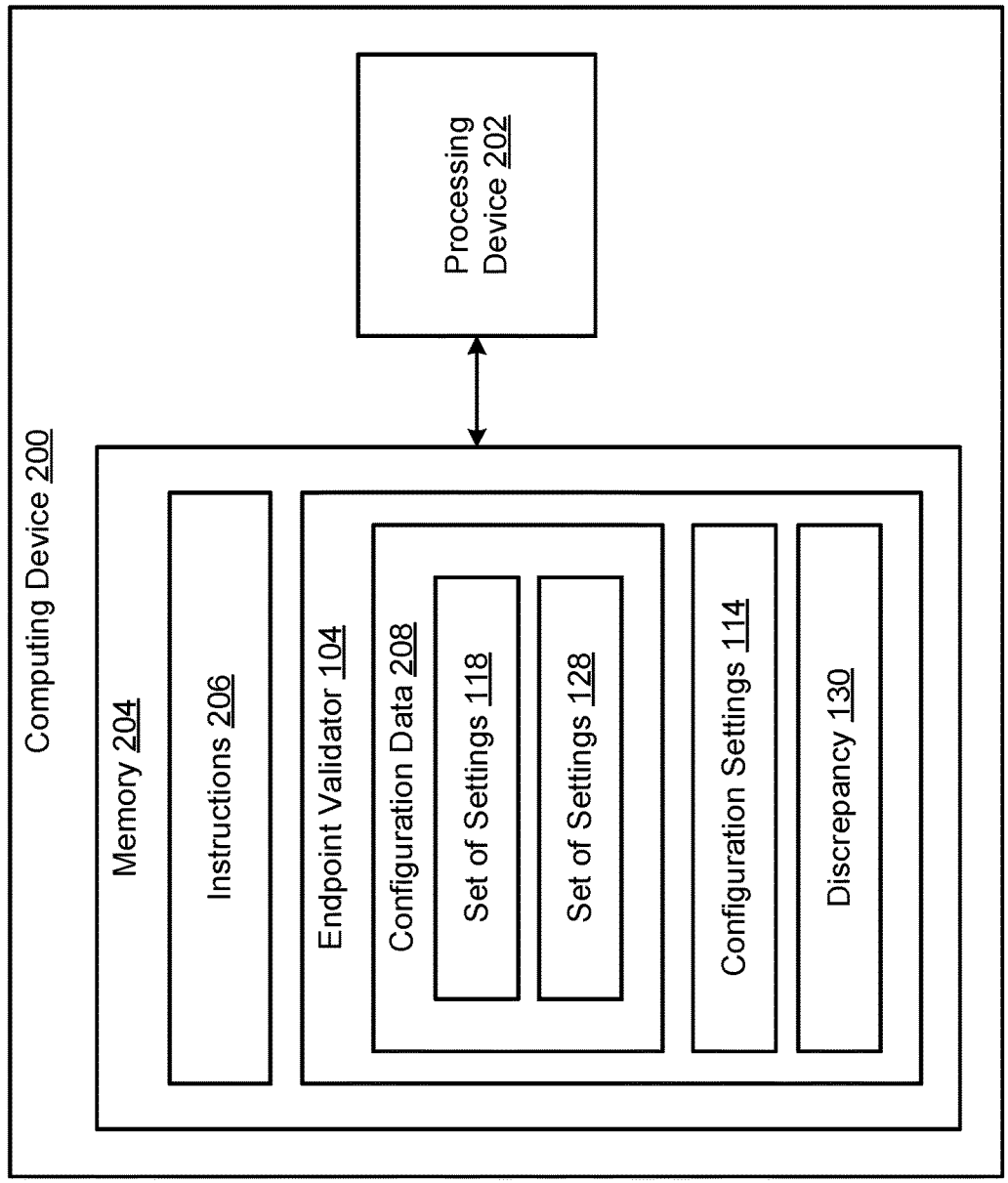
FIG. 2 is a block diagram of an example of a computing device with an endpoint validator for validating an endpoint in a service mesh according to some aspects of the present disclosure.

FIG. 2 is a block diagram of an example of a computing device 200 with an endpoint validator 104 for validating an endpoint in a service mesh according to some aspects of the present disclosure. The system includes a processor 202 communicatively coupled to a memory 204. In some examples, the processor 202 and the memory 204 can be part of a distributed computing environment, such as the distributed computing environment 100 of FIG. 1.

The processor 202 can include one processor or multiple processors. Non-limiting examples of the processor 202 include a Field-Programmable Gate Array (FPGA), an application-specific integrated circuit (ASIC), a microprocessor, or a combination thereof. The processor 202 can execute instructions 206 stored in the memory 204 to perform operations. In some examples, the instructions 206 can include processor-specific instructions generated by a compiler or an interpreter from code written in any suitable computer-programming language, such as C, C++, C #, and Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. In some examples, at least some of the memory 204 can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the memory 204 includes an endpoint validator 104 that can be executed by the processor 202 for validating an endpoint 110. The endpoint validator 104 can receive configuration settings 114 for an endpoint 110 (e.g., from the administrative portal 112 of the endpoint 110) and configuration data 208. The configuration data 208 can include settings 118 received from the service mesh API 116, and settings received from the platform API 126, or both of these. The endpoint validator 104 may determine a discrepancy 130 between the configuration settings 114 and the configuration data 208. The endpoint validator 104 may then output the discrepancy 130 for use in resolving an operational error relating to the service mesh 102.

Figure 3:
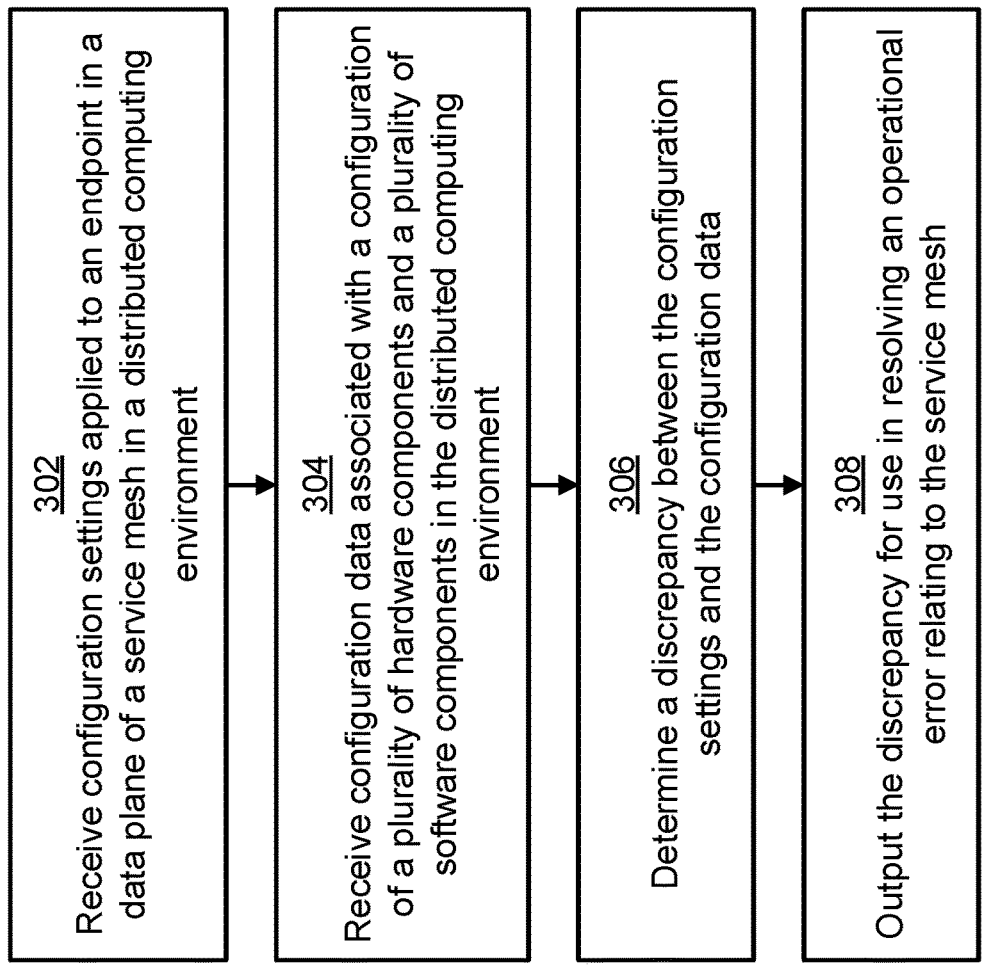
FIG. 3 is a flow chart of an example of a process for validating an endpoint in a service mesh according to some aspects of the present disclosure.

In some examples, the processor 202 can implement some or all of the steps shown in FIG. 3. Other examples can include more steps, fewer steps, different steps, or a different order of steps than is shown in FIG. 3. The steps of FIG. 3 are discussed below in reference to the components discussed above in relation to FIGS. 1-2.

At step 302, the processor 202 receives configuration settings 114 applied to an endpoint 110 in a data plane 106 of a service mesh 102 in a distributed computing environment 100. The endpoint 110 may be associated with a service 132 executing in the distributed computing environment 100. The endpoint 110 may be a proxy in some examples. The endpoint 110 may be used for authentication and authorization, traffic routing, tracing instrumentation, event monitoring, or any combination of these for the service 132.

At block 304, the processor 202 receives configuration data 208 associated with hardware components 122 and software components 124 in the distributed computing environment 100. The hardware components 122 and the software components 124 may be used by the container orchestration platform 120 to execute the service associated with the endpoint 110. The configuration data 208 can include settings 118 for a control plane 108 of the service mesh 102, such as network settings applicable to multiple endpoints in the data plane 106 and hardware settings for hardware in the data plane 106. The configuration data 208 can also include settings 128 for the container orchestration platform 120, such as workload data, instance data, and container data.

At block 306, the processor 202 determines a discrepancy 130 between the configuration settings 114 and the configuration data 208. In some examples, the discrepancy 130 can be due to an issue with the configuration settings 114 for the endpoint 110. Alternatively or additionally, the discrepancy 130 may be due to an issue with how the container orchestration platform 120 is configured or an issue with how the control plane 108 of the service mesh 102 is configured. For example, the discrepancy 130 may be due to an insufficient amount of processing power or memory being allocated by the container orchestration platform 120 to a container executing the endpoint 110.

At block 308, the processor 202 outputs the discrepancy 130 for use in resolving an operational error relating to the service mesh 102. In some examples, the discrepancy 130 may be output to a graphical user interface to be displayed to a user, such as the graphical user interface 400 depicted in FIG. 4. The processor 202 may also automatically update the configuration settings 114 of the endpoint to resolve the operational error. If the discrepancy 130 involves the hardware components 122 or software components 124, the processor 202 may automatically update the settings 128 for the container orchestration platform 120 or settings 118 for the control plane 108 to resolve the discrepancy 130. In some examples, the processor 202 may update the configuration setting 114 to have the same value as in the corresponding setting in the settings 118 or settings 128. In other examples, the processor 202 may determine the update by accessing a set of predefined rules or a lookup table. For example, the set of predefined rules may map types of discrepancies or types of errors to certain types of updates.

Figure 4:
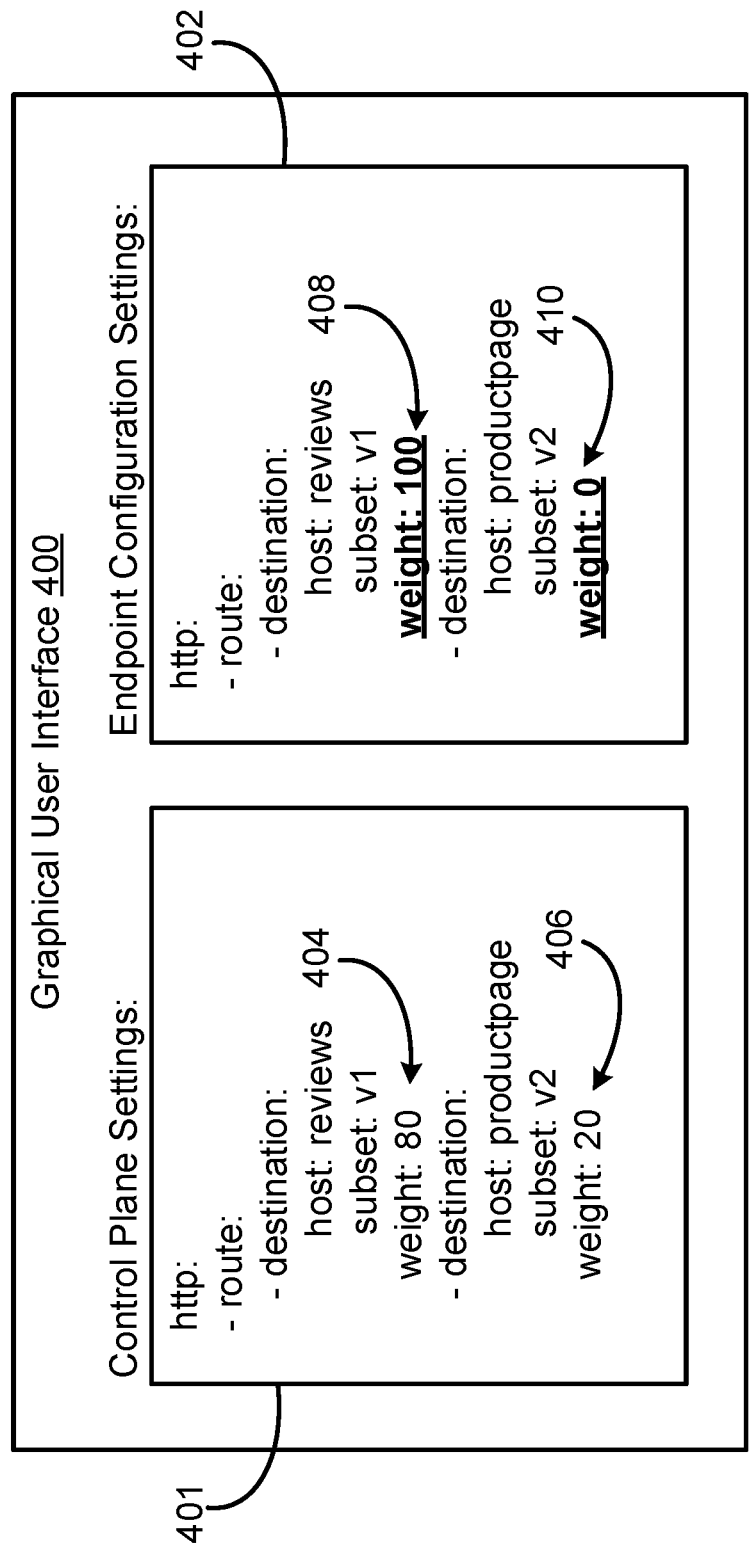
FIG. 4 is a block diagram of a graphical user interface for displaying a discrepancy in a configuration setting of an endpoint according to some aspects of the present disclosure.

FIG. 4 is a block diagram of a graphical user interface 400 for displaying a discrepancy 130 in a configuration setting 114 of an endpoint 110 according to some aspects of the present disclosure. The graphical user interface 400 may display a frame 401 depicting settings 118 for the control plane 108 and a frame 402 depicting configuration settings 114 for the endpoint 110. In this example, the distributed computing environment 100 may include a service called "reviews" and a service called "productpage". Each service may have an associated endpoint. The settings 118 for the control plane 108 may define a traffic flow for the services. As depicted in frame 401 of FIG. 4, 80% of incoming requests should be routed to the "reviews" service and 20% of incoming requests should be routed to the "productpage" service. But in this example, the service mesh 102 may experience an operational error where the "productpage" service receives no incoming requests.

The endpoint validator 104 may determine a discrepancy 130 that is causing the operational error. To do so, the endpoint validator 104 may receive the configuration settings 114 from the endpoint 110, the settings 118 from the service mesh API 116, and the settings 128 from the platform API 126. The endpoint validator 104 can then identify a discrepancy 130 between the endpoint's configuration settings 114 and the other settings 118-128. In this example, the settings 118 for the service mesh 102 for the "productpage" endpoint 110 and the "reviews" endpoint 110 may not align with the configuration settings 114 for the endpoint 110. For example, at line 408, the proportion or "weight" of incoming requests for the "reviews" service is set to 100%, rather than 80% as included in line 404 of the configuration settings 114. And at line 410, the weight of incoming requests for the "productpage" service is set to 0%, rather than 20% as included in line 406 of the configuration settings 114. This may result in the traffic flow for these services being different from what is expected.

In some examples, the location of the discrepancy 130 can be highlighted in the graphical user interface 400 on the display. For example, the graphical user interface 400 may visually output the settings 118 in a frame 402, where the configuration settings have certain lines, such as lines 408 and 410, emphasized (e.g., underlined or highlighted) to indicate that those are the lines raising the discrepancy 130. The graphical user interface 400 may additionally include interactivity regarding the discrepancy 130. For example, information about the discrepancy 130 may be provided in a pop-up window when the user clicks or otherwise interacts with line 408 or line 410. In some examples, the information may be a recommended update to the settings 118 associated with the selected line to resolve the operational error. In some examples, a user may interact with the graphical user interface 400 update the particular settings 118 to resolve the operational error. For example, the user may input a command or select a button to change line 408 to "weight: 80" and to change line 410 to "weight: 20." In another example, the user may input a command to re-start the control plane 108, which may resolve the operational error.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined with any other example to yield further examples.

What is claimed is:

1. A non-transitory computer-readable medium comprising program code that is executable by a processor for causing the processor to:
receive configuration settings applied to an endpoint in a data plane of a service mesh in a distributed computing environment, the endpoint being for accessing a service of the service mesh, and the endpoint being distinct from the service;
receive configuration data including a set of settings for a container orchestration platform in the distributed computing environment, the configuration data indicating a configuration of the container orchestration platform in the distributed computing environment, the container orchestration platform being distinct from the endpoint and the service;
determine a discrepancy between the configuration settings and the configuration data; and
output the discrepancy for use in resolving an operational error relating to the service mesh.

2. The non-transitory computer-readable medium of claim 1, wherein the configuration data further comprises another set of settings for a control plane of the service mesh, and further comprising code that is executable by the processor for causing the processor to obtain the other set of settings by interacting with an application-programming interface for the service mesh.

3. The non-transitory computer-readable medium of claim 2, wherein the other set of settings comprise a network setting and a hardware setting for hardware in the data plane.

4. The non-transitory computer-readable medium of claim 1, further comprising code that is executable by the processor for causing the processor to obtain the set of settings by interacting with an application-programming interface for the container orchestration platform.

5. The non-transitory computer-readable medium of claim 4, wherein the set of settings comprise workload data, instance data, and container data.

6. The non-transitory computer-readable medium of claim 1, further comprising program code that is executable by the processor for causing the processor to:
based on determining the discrepancy, update a particular configuration setting among the configuration settings to resolve the operational error.

7. The non-transitory computer-readable medium of claim 1, further comprising program code that is executable by the processor for causing the processor to:
output a graphical user interface in which a particular configuration setting among the configuration settings is highlighted to indicate a location of the discrepancy; and
receive, from a user via the graphical user interface, a command to update the particular configuration setting to resolve the operational error.

8. The non-transitory computer-readable medium of claim 1, further comprising code that is executable by the processor for causing the processor to obtain the configuration settings by interacting with an administrative portal for the endpoint.

9. A method comprising:
receiving, by a processor, configuration settings applied to an endpoint in a data plane of a service mesh in a distributed computing environment, the endpoint being for accessing a service of the service mesh, and the endpoint being distinct from the service;
receiving, by the processor, configuration data including a set of settings for a container orchestration platform in the distributed computing environment, the configuration data indicating a configuration of the container orchestration platform in the distributed computing environment, the container orchestration platform being distinct from the endpoint and the service;
determining, by the processor, a discrepancy between the configuration settings and the configuration data; and
outputting, by the processor, the discrepancy for use in resolving an operational error relating to the service mesh.

10. The method of claim 9, wherein the configuration data further comprises another set of settings for a control plane of the service mesh, and further comprising obtaining the set of settings by interacting with an application-programming interface of the service mesh.

11. The method of claim 10, wherein the other set of settings comprise a network setting and a hardware setting for hardware in the data plane.

12. The method of claim 9, further comprising obtaining the set of settings by interacting with an application-programming interface of the container orchestration platform.

13. The method of claim 12, wherein the set of settings comprises workload data, instance data, and container data.

14. The method of claim 9, further comprising:
based on determining the discrepancy, updating a particular configuration setting among the configuration settings to resolve the operational error.

15. The method of claim 9, further comprising:
outputting a graphical user interface in which a particular configuration setting among the configuration settings is highlighted to indicate a location of the discrepancy; and
receiving, from a user via the graphical user interface, a command to update the particular configuration setting to resolve the operational error.

16. The method of claim 9, further comprising obtaining the configuration settings by interacting with an administrative portal for the endpoint.

17. A system comprising:
a processor; and
a non-transitory computer-readable memory comprising instructions for an endpoint validator, the endpoint validator being executable by the processor to cause the processor to:
receive configuration settings applied to an endpoint in a data plane of a service mesh in a distributed computing environment, the endpoint being for accessing a service of the service mesh, and the endpoint being distinct from the service;
receive configuration data including a set of settings for a container orchestration platform in the distributed computing environment, the configuration data indicating a configuration of the container orchestration platform in the distributed computing environment, the container orchestration platform being distinct from the endpoint and the service;
determine a discrepancy between the configuration settings and the configuration data; and
output the discrepancy for use in resolving an operational error relating to the service mesh.

18. The system of claim 17, wherein the configuration data further comprises another set of settings defining another configuration of the service mesh, and wherein the non-transitory computer-readable memory further comprises instructions that are executable to obtain the other set of settings by interacting with an application-programming interface for the service mesh.

19. The system of claim 18, wherein the other set of settings comprise a network setting and a hardware setting for hardware in the data plane.

20. The system of claim 17, wherein the non-transitory computer-readable memory further comprises instructions that are executable to obtain the set of settings by interacting with an application-programming interface for the container orchestration platform.

* * * * *